United States Patent Office 2,731,507
Patented Jan. 17, 1956

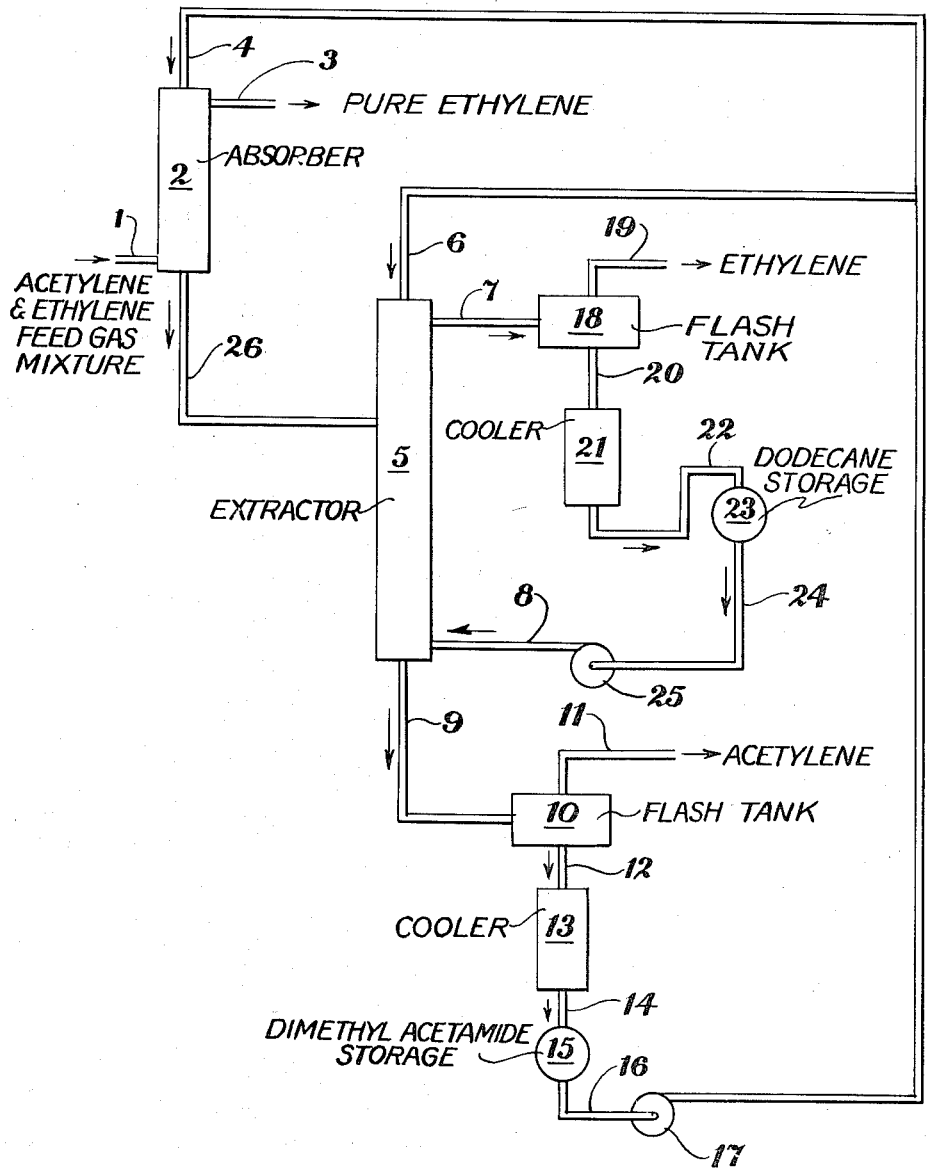

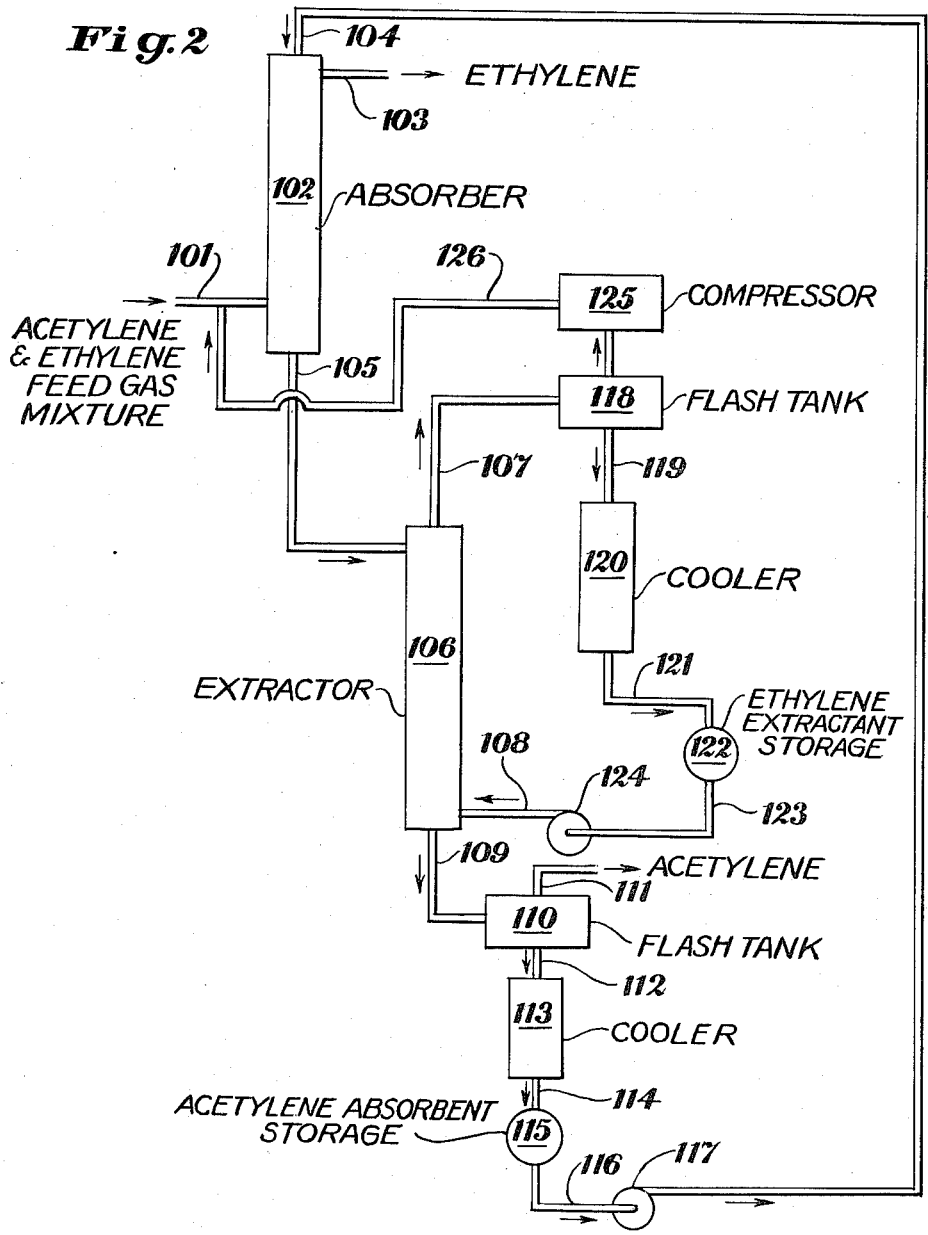

2,731,507

RECOVERY OF ACETYLENE FROM GAS MIXTURES BY ABSORPTION IN SELECTIVE SOLVENTS

George A. Akin, Kingsport, Tenn., assignor to Eastman Kodak Company, Rochester, N. Y., a corporation of New Jersey Application January 14, 1953, Serial No. 331,281

6 Claims. (Cl. 260—679)

The present invention relates to the recovery of acetylene in a pure form from gas mixtures by means of absorption in a preferential liquid solvent. More particularly the invention is concerned with removal of normally gaseous impurities, e. g. ethylene from acetylene-rich solutions resulting from an absorption step carried out with a preferential liquid solvent.

To separate acetylene from gas mixtures, numerous selective solvents have been used. Among the more common of these solvents are triethyl phosphate, dimethylformamide, dimethoxytetraethylene glycol, acetone, and water. These solvents are all characterized by abnormally high solubilities for acetylene as compared with solubilities for other types of hydrocarbon gases of similar boiling points and critical constants.

The normal procedure for separation and recovery of acetylene from gas mixtures by means of absorption in a preferential liquid solvent calls for absorption of the acetylene in the solvent in an absorption tower and subsequent flashing of the acetylene at a reduced pressure or an elevated temperature. The acetylene recovered in this way is always contaminated with some of the other normally gaseous constituents of the original mixture which are soluble to a slight extent in the solvent. In order to recover pure acetylene, these normally gaseous impurities customarily are removed before flashing off the acetylene for recovery by passing the solvent from the absorption tower into a stripping tower. In the latter tower the acetylene is partially vaporized and used to strip out the less soluble gases. Thus, the solvent containing essentially pure acetylene is left at the bottom of the stripping tower. Acetylene is then flashed from the solvent for recovery in the pure state.

Acetylene is, however, unusual among gases in that at pressures higher than about 1.5 atmospheres absolute, it is unstable to the extent of being subject to explosions. The exact critical pressure required for susceptibility to explosion is dependent on a number of variables including the temperature, but at normal temperatures the value is about 1.5 atmospheres. For this reason, the amount of acetylene which can be dissolved in one of the selective solvents and handled safely is limited by the concentration necessary to produce pressures in the hazardous range in the vapor phase in equipment used in subsequent operations.

According to the data of Boesler, FIAT Final Report No. 720, the partial pressure of acetylene in a gas mixture which can be handled safely is higher in mixtures dilute in acetylene. For example, in gas mixtures containing equal molar quantities of acetylene and ethylene, the limit of safe partial pressure of acetylene is about 4 atmospheres absolute, compared with 1.5 atmospheres absolute for pure acetylene. Thus, an absorption tower operating with a feed gas containing equal parts of acetylene and ethylene could be operated safely at pressures of 8 atmospheres, and the solvent could be essentially saturated with acetylene at 4 atmospheres partial pressure. This mixture, however, could not be safely handled in the stripping tower, since the gas liberated from the solution at the bottom of the tower would be dangerous at the operating pressure.

It is an object of this invention to provide a safe method for accomplishing the removal of ethylene (or other gas) from the acetylene solvent when the solvent is saturated with acetylene at a pressure higher than the safe operating pressure for pure acetylene. Other objects will be obvious from the following specification and claims:

I have now discovered that certain non-polar hydrocarbon liquids, e. g. certain paraffin oils can be used to selectively extract the gaseous impurities dissolved in certain polar liquid organic selective solvents used for absorbing acetylene. For example, I have found that dodecane will extract in a countercurrent extraction unit essentially all of the ethylene from dimethylformamide or dimethylacetamide without removing more than a small percentage of the acetylene. Thus, my discovery indicates that the usual selective solvents can be extracted with an oil under conditions such that all of the gas will remain in the liquid phase and no hazardous gas-phase concentration of acetylene will exist. The advantage gained results from the use of smaller quantities of solvent and consists of lower operating cost of the separation process.

In accordance with the discovery, the invention resides in a method for recovery of pure acetylene from dilute gas mixtures comprising absorption of acetylene in a selective solvent under relatively high pressures and subsequent removal of a normally gaseous impurity from the selective solvent solution by means of a liquid-liquid extraction with a second solvent.

The invention is illustrated in the drawings, in which Fig. 1 is a diagrammatic representation of an arrangement of apparatus for recovering pure acetylene in accordance with the invention, and Fig. 2 is a diagrammatic representation of a similar apparatus designed to provide an additional intermediate purification step.

The character of the apparatus illustrated in the drawings will be understood from a description of operations as given in the following examples:

*Example 1*

A mixture of 35 per cent acetylene and 65 per cent ethylene was fed by line 1 to absorption column 2 at a pressure of 300 p. s. i. g. For each 100 std. cu. ft. of gas fed to the column, about 0.2 cu. ft. of dimethylacetamide was fed to the column through line 4. Acetylene was absorbed from the gas, and ethylene practically free of acetylene left the column by line 3 at a rate of 59 std. cu. ft. per 100 std. cu. ft. of entering gas. Dimethylacetamide, containing about 35 std. cu. ft. of acetylene and 6 std. cu. ft. of ethylene per 100 std. cu. ft. of feed gas, was removed from absorption column 2 by line 26 to extraction column 5. The ethylene contained in the dimethylacetamide was extracted from the dimethylacetamide with about 0.175 cu. ft. of dodecane per 100 std. cu. ft. of feed gas. Dodecane was fed to the extraction column from storage tank 23 by pump 25 through lines 24 and 8. The dodecane in the top of the extraction column 5 was treated with approximately 0.013 volume of dimethylacetamide per 100 standard volumes of feed gas. This dimethylacetamide, fed to the column by line 6, removed the acetylene from the dodecane, which left the column through line 7. The dodecane leaving extraction column 5 by line 7 contained about 6 std. cu. ft. of ethylene per 100 std. cu. ft. of feed gas, and this solution was sent to flash tank 18 from which the ethylene was removed from the system through line 19. The dodecane was then cooled by cooler 21 and stored in tank 23.

Dimethylacetamide containing about 35 std. cu. ft. of acetylene per 100 std. cu. ft. of feed gas was withdrawn from extraction column 5 by means of line 9 to flash tank 10 from which the acetylene was removed from the system through line 11. The dimethylacetamide was then cooled in cooler 13 and stored in tank 15 before being fed back to absorber 2 and extractor 5.

In a system of the type illustrated in Fig. 1, the degree of purity of the recovered ethylene and acetylene depends on the degree of removal of the acetylene from the dimethylacetamide in flash tank 10, on the degree of removal of the ethylene from the dodecane in flash tank 18, and on the solvent ratios in the absorber and extractor.

*Example 2*

A mixture containing 45 per cent acetylene and 55 per cent ethylene was fed to absorption tower 102 by means of line 101 at a pressure of 150 p. s. i. g. For each 100 std. cu. ft. of gas fed to the column, about 0.27 cu. ft. of dimethylformamide was fed to the top of the column by line 104. Acetylene was absorbed from the gas, and about 55 std. cu. ft. of practically pure ethylene per 100 std. cu. ft. of feed gas left column 102 by line 103. Dimethylformamide containing about 49 std. cu. ft. acetylene and 7 cu. ft. ethylene per 100 std. cu. ft. of feed gas was withdrawn from column 102 by means of line 105 and fed to the top of extraction column 106. In the extraction column the ethylene and a small part of the acetylene were extracted from the dimethylformamide by a straw oil of average molecular weight of about 180. The amount of oil required was about 0.25 cu. ft. per 100 std. cu. ft. of feed gas and was fed to the extraction column by pump 124 through line 108. The dimethylformamide which left the extraction column by line 109 contained about 45 std. cu. ft. of acetylene per 100 std. cu. ft. of feed gas, and was fed to flash tank 110. In this tank the acetylene was flashed off and was recovered practically pure. The dimethylformamide was cooled in cooler 113 and stored in tank 115 before being pumped by pump 117 back to absorption column 102 through line 104.

The straw oil in extraction tower 106 was removed through line 107 to flash tank 118 in which about 4 std. cu. ft. acetylene and 7 std. cu. ft. ethylene per 100 std. cu. ft. of feed gas was flashed off. This gas mixture was recycled to absorber 102 by compressor 125 through line 126. The straw oil from the flash tank was cooled in cooler 120 and stored in tank 122 before being pumped back to extraction tower 106 by pump 124. Recoveries of practically pure acetylene and ethylene from the mixed gas stream were substantially complete.

This invention has the advantage of allowing lower cost recovery of practically pure acetylene from gas mixtures using a safe method of operation. It also allows the safe recovery of practically pure acetylene from gas mixtures by operating at pressures which would be hazardous when using the usual methods of removing gaseous impurities from the solvent containing acetylene. That is to say, the discovery of an extraction liquid which is a non-solvent for the acetylene solvent as well as a solvent having a preference for ethylene over acetylene has led to a normal process enabling one to operate an acetylene recovery system at an efficient high pressure and at a high acetylene concentration in solvent without danger of an acetylene explosion in the gas phase.

The various methods of operating the absorption equipment need not be discussed in detail. It is obvious that the amount of solvent required will vary with the pressure and temperature of operation and the column designs. In general, the temperature of operation should be low, e. g. 0° C. to 40° C. since this increases the solubility of the gases in the solvent.

The operation of the extraction equipment can be varied to some extent, but the pressure of operation of the extraction equipment should be high enough, e. g. above that of the absorber to prevent acetylene from being desorbed from the solvents. The temperature of the oil to the extraction column should be low enough, e. g. 0° C. to 40° C., to prevent the vaporization of gas at the feed point. It is obvious that any suitable type of countercurrent extraction equipment may be used, but a column type extractor is a very simple and suitable type.

Although the examples given are for the separation of acetylene and ethylene, acetylene can be separated from any other gases for which the extracting solvent has suitable solubility characteristics. These would include most of the common gases, but some materials such as sulfur dioxide and hydrogen sulfide cannot be successfully removed from dimethylformamide by hydrocarbon solvents.

The systems dimethylformamide with straw oil and dimethylacetamide with dodecane and the other systems specifically suggested in the present specification are examples of preferred solvent systems for use in the invention. However, the invention is, of course, not limited to those particular systems, as other systems may be found quite satisfactory. The best selective solvents for acetylene are polar compounds. Solvents of a non-polar type usually do not selectively absorb acetylene to any great extent. Moreover, the polar and non-polar type compounds tend to be immiscible. This is particularly true of the higher molecular weight materials. To be effective in an extraction system, the mutual solubility of the two solvents should be low. This principle is used to advantage in the examples in which the amides, highly polar, are used with high molecular weight hydrocarbons which are highly non-polar. A third system which appears to be advantageous is one employing triethyl phosphate and kerosene.

As regards the second, that is, extraction solvent, it may be said that any solvent which has an appreciably higher ratio of solubility of ethylene to acetylene than the selective solvent and which is largely insoluble in the selective solvent can be used. For the amide type of selective solvents, particularly dimethylformamide and dimethylacetamide, aliphatic hydrocarbon oils have been found to be satisfactory. The following table of solubilities illustrates the characteristics of this type of system:

System—Dimethylacetamide, dodecane, acetylene, and ethylene at 2° C.
Total pressure—4.44 atmospheres
Partial pressure of acetylene—2.09 atmospheres
Partial pressure of ethylene—2.35 atmospheres

|  | Acetylene | Ethylene |
|---|---|---|
| Solubility [1] in amide layer | 59.6 | 5.37 |
| Solubility [1] in dodecane layer | 5.33 | 8.23 |
| Distribution coefficient | 11.2 | 0.65 |
| Ratio of distribution coefficients | 17.2 | 17.2 |

[1] Expressed as volumes of gas at standard conditions per volume of solvent.

I claim:

1. In a process for the recovery of acetylene in pure form from a gas mixture of acetylene and ethylene, which process includes the steps of (a) treating the gas mixture with a liquid solvent having a preferential affinity for acetylene to form a solution rich in acetylene and containing a relatively small amount of ethylene as an impurity, (b) removing the ethylene impurity from the solution, and (c) subsequently liberating acetylene in a pure form from the solution, the steps (a) and (b) being conducted at potentially dangerous high temperatures and pressures, an improved method for conducting the step (b) ethylene impurity removal safely and efficiently comprising subjecting the acetylene-rich solution containing the ethylene impurity to a counter-current liquid-liquid extraction with an extracting solvent having a preferential affinity for the ethylene impurity and relatively little solvent power for acetylene and the acetylene solvent and thereby removing the ethylene impurity from the liquid acetylene solution as a liquid solution of ethylene.

2. A process as defined in claim 1 wherein the extracting solvent is dodecane.

3. A process as defined in claim 2 wherein the acetylene preference solvent is dimethylacetamide.

4. A process as defined in claim 3 wherein the extracting solvent is straw oil.

5. A process as defined in claim 4 wherein the acetylene preference solvent is dimethylformamide.

6. A process as defined in claim 5 wherein the process includes in the step (b) extraction operation the introduction of fresh acetylene preference solvent.

References Cited in the file of this patent

UNITED STATES PATENTS

| | | |
|---|---|---|
| 2,146,448 | Scott et al. | Feb. 7, 1939 |
| 2,180,496 | Balcar | Nov. 21, 1939 |
| 2,183,148 | Murphree | Dec. 12, 1939 |
| 2,238,490 | Hasche | Apr. 15, 1941 |
| 2,301,240 | Baumann et al. | Nov. 10, 1942 |
| 2,552,198 | Mayland et al. | May 8, 1951 |
| 2,659,453 | Robinson | Nov. 17, 1953 |